United States Patent [19]

Abrahamson

[11] Patent Number: 4,836,731
[45] Date of Patent: Jun. 6, 1989

[54] METHOD AND APPARATUS FOR CUBING STONES OF DIVERSE GEOMETRIES

[75] Inventor: Daniel P. Abrahamson, Phoenix, Ariz.

[73] Assignee: Builders Equipment Company, Glendale, Ariz.

[21] Appl. No.: 164,788

[22] Filed: Mar. 7, 1988

[51] Int. Cl.⁴ .................................................. B65G 57/24
[52] U.S. Cl. ..................................... 414/789.1; 294/2;
294/63.1; 414/786; 414/791.6; 414/792.9;
414/794.2
[58] Field of Search ............. 414/35, 36, 57, 67,
414/70, 71, 82, 84, 85, 786; 294/2, 63.1, 67.3,
67.33, 119.1

[56] References Cited

U.S. PATENT DOCUMENTS

| | | |
|---|---|---|
| 2,598,222 | 5/1952 | Cahners et al. . |
| 3,149,732 | 9/1964 | Gagnon et al. . |
| 3,180,506 | 4/1965 | Moskopf et al. .................. 294/63.1 |
| 3,257,006 | 6/1966 | Kampert . |
| 3,260,379 | 7/1966 | Bason . |
| 3,387,718 | 6/1968 | Roth et al. ...................... 294/2 X |
| 3,671,165 | 6/1972 | Schwellenbach .................. 425/445 |
| 3,696,945 | 10/1972 | Bobolts . |
| 3,833,132 | 9/1974 | Alduk . |
| 3,901,391 | 8/1975 | Carlson et al. . |
| 4,159,058 | 6/1979 | Zimmerman ......................... 414/84 |
| 4,193,725 | 3/1980 | Schiepe et al. ..................... 414/83 |
| 4,338,056 | 7/1982 | Abrahamson ....................... 414/152 |
| 4,352,616 | 10/1982 | Brenner ............................. 414/31 |
| 4,498,831 | 2/1985 | Salts ................................. 414/46 |
| 4,592,692 | 6/1986 | Suizu et al. ...................... 414/71 X |
| 4,603,896 | 8/1986 | Vasseur et al. ..................... 294/2 |

FOREIGN PATENT DOCUMENTS

| | | |
|---|---|---|
| 1235808 | 3/1967 | Fed. Rep. of Germany . |
| 2332293 | 2/1975 | Fed. Rep. of Germany ..... 294/63.1 |
| 2434060 | 1/1976 | Fed. Rep. of Germany ........ 414/71 |
| 8601355 | 5/1986 | Fed. Rep. of Germany . |
| 8300230 | 8/1984 | Netherlands . |
| 910524 | 3/1982 | U.S.S.R. ........................... 294/67.3 |

Primary Examiner—Leslie J. Paperner
Attorney, Agent, or Firm—Luedeka, Hodges & Neely

[57] ABSTRACT

A method and apparatus for cubing paving stones or similar stones which are not adapted to forming a self-supporting unit through the means of pressure applied to opposite sides of a tier of such stones. In the present invention, the stones on a flat pallet are contacted with side pressure to bring the stones into a compact unit on the pallet. While the stones are so clamped, the pallet is clamped along its opposite side edges and transported, with the tier of stones thereon, to a location above a previously deposited tier of such stones or a pallet. When so positioned, the pallet is withdrawn from its supporting position beneath the stones and the stones settle gently onto the previously laid tier or pallet. The force applied to the stones on the pallet is chosen to be less than the force that would be required to urge the stones against one another to form a self-supporting unit.

9 Claims, 6 Drawing Sheets

METHOD AND APPARATUS FOR CUBING STONES OF DIVERSE GEOMETRIES

Field of the Invention

This invention relates to methods and apparatus for collecting a plurality of individual stones such as paving stones into multitiered cubes for storage or transporting.

BACKGROUND OF THE INVENTION

Paving stones or pavers are names which have been applied to concrete stones which are used in forming decorative patterns in walkways, patios, streets, and roadways. These stones are of nonrectilinear geometry, but rather commonly comprise "rounded" squares, oblongs, trapezoids, etc. Typical shapes of these products are depicted in FIG. 1 herein. In FIG. 2 there is depicted one architectural pattern of arranging such stones. As used herein, the term "stone" refers to a cast or compressed geometrical shape, normally of concrete or similar composition. The stone normally has at least one, and commonly two, flat surfaces, one bottom such surface being adapted to contact a supporting substructure such as a sand bed or other substructure, and the other top flat surface intended to face upwardly and, cooperatively with other stones, to form a flat surface over which foot or vehicular traffic passes. Typical stones may be "squares" of 3 to 6 inches across, or oblongs of 2 inches by 4 inches, all of which usually are of the same thickness, e.g. about 2¾ inches.

It has long been common in the building industry to employ rectangular concrete blocks in forming walls, etc. One apparatus for making such concrete blocks is shown in U.S. Pat. No. 3,671,165. Of recent, the apparatus as shown in such patent has been adapted to the manufacture of concrete stones of nonrectilinear geometry, specifically paving stones and the like. In U.S. Pat. No. 3,671,165 there is disclosed the technique of disposing "green", that is uncured, concrete blocks on a flat metal pallet for conveying to a kiln for curing of the block, such blocks remaining on the pallet during the curing process and further remaining on the pallets as the cured blocks are conveyed away from the kiln. It has been customary heretofore to convey the block-laden pallets to a cubing station, where a plurality of the blocks are arranged into individual tiers, the tiers being clamped at their sides with sufficient force to cause the rectilinear blocks to form a self-supporting unit that can be lifted as a unit off the pallet and then transported to a stack or cube comprising a multiplicity of tiers.

In the instance of paving stones which have nonrectilinear geometry, rounded edges, diverse geometries, etc. there is not know to be available any successful method or apparatus for clamping the stones arranged in a tier at their sides such that the tier can be successfully lifted off the pallet and moved to a cube without occasionally dropping one stone which causes the whole tier to fall. This is due in large part to the irregular geometry of the stones and their diverse geometries which prevents the development of proper horizontal pressure applied to the sides of the stones and conveyed through the tier from stone to stone that will permit the tier to be handled as a unit without a supporting pallet underneath the tier. Odd shaped stones commonly are removed by hand from the pallet and then placed in the cube. This is the general procedure for cubing rounds and triangulars since these shapes are especially difficult and often impossible to clamp into a self-supporting tier. Whereas some of the uniform shaped stones may be clamped to a degree sufficient to become self-supporting, even these stones frequently fall out of the clamped tier, such as when the mix is too wet and when the stones are cast and the sides of the stones slump creating bulging sides to the stones which are not amenable to clamping. The problem of dropping stones from a clamped tier is not limited to the loss of the stones themselves as through breakage or chipping, but rather, a serious problem associated with such drops is the loss in manufacturing time. Specifically, when a drop occurs, the entire manufacturing flow is shut down for that period of time required to clean up the broken and unbroken stones. In addition to the loss of manufacturing time, there is the accompanying extra cost of the manpower for performing the cleanup. These expenses of manufacture contribute to the ultimate selling price of the stone to consumers. A further problem exists in the instance of paving stones in that edge chipping during handling can not be tolerated because the stones are intended to be placed flat on a prepared surface to present an aesthetically pleasing pattern and such pattern is effectively destroyed by one or more stones in the pattern that have chipped edges.

Further, in the paving stone industry, it is becoming standard to place on the pallet entering the kiln a sufficient number of stones to constitute a tier of the intended cube of final product. Thus, as the pallet enters the kiln it contains a complete tier of stones. This tier of stones continues with the pallet through the kiln and is conveyed from the kiln to a cubing station, while still on the inital pallet. Other manufacturing practices involve production of the stones by any of several methods, accumulating the cured stones and thereafter arranging these stones in a tier on a pallet.

The present invention proposes a method and apparatus for accepting pallets of such paving stones or other similar stones and efficiently preparing the cube therefrom.

It is therefore an object of the present invention to provide a method for cubing paving stones or the like.

It is another object of the present invention to provide a method for cubing paving stones or the like wherein the stones in a tier are deposited substantially individually as a layer in a cube of such stones.

It is another object of the present invention to provide a method for cubing paving stones or like stones which minimizes the likelihood of breakage of the stones in the course of developing a cube thereof.

It is another object of the present invention to provide a method fur cubing paving stones or like stones which minimizes the likelihood of breakage of the stones in the course of developing a cube thereof.

It is another object of the present invention to provide a method for cubing paving stones or like stones which minimize the potential down-times of the stone manufacturing operations due to disruptions in the cubing operations thereof.

It is another object of the present invention to provide a method for cubing paving stones or like stones which can be essentially automated, thereby requiring a minimum of manual labor.

It is another object of the present invention to provide a method for cubing paving stones or like stones in which the stones are gripped along opposite sides thereof with a pressure which is less than that which is required to develop a self-supported unit of such stones and while so gripping the stones, arranging individual tiers thereof in a cube.

It is another object of the present invention to provide apparatus for cubing stones of nonrectilinear and/or diverse geometries.

Other objects and advantages of the invention will be recognized from the description contained herein including the drawings in which.

Figure 1:
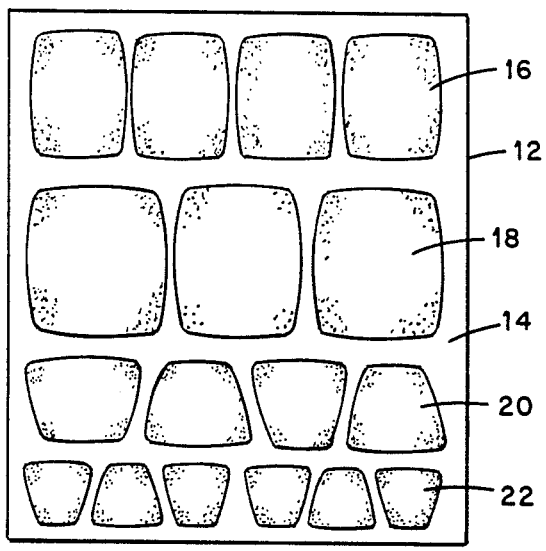
FIG. 1 is a representation of a plurality of differently shaped stones constituting a tier disposed on a transfer pallet (neither pallet nor stones are to scale)
Figure 2:
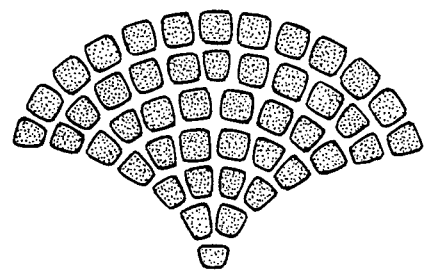
FIG. 2 is a representation of an architectural design employing stones of the type depicted in FIG. 1.

It is to be noted that certain elements are either omitted or shown fragmentarily in certain of the FIGURES for purposes of clarity.

SUMMARY OF THE INVENTION

Briefly stated, the present invention comprises a method and apparatus for cubing paving stones or similar stones which are not adapted to forming a self-supporting unit through the means of pressure applied to opposite sides of a tier of such stones. In accordance with the present invention, a plurality of such stones, prearranged on a flat pallet are introduced to a cubing station. Within the cubing station the tier of stones is engaged along the sides thereof to urge the stones into a compact group on the pallet. The force employed to urge the stones toward one another on the pallet is chosen to be less than the force required to hold the stones in a self-supporting unit for lifting off the pallet. In a typical tier containing from about 15 to about 50 or more stones on a ½ inch thick pallet measuring 37 inches by 55 inches on its flat side, a pressure of less than about 40 psi, depending upon the size, shapes, mix, etc. of the stones, applied to the stones by the side gripping assemblies described herein has been found to be adequate to position and maintain the stones. This is to be compared with about twice or more of such pressure as is required to maintain a tier of square-sided blocks of the same weight as the stones, in a self-supporting unit capable of being lifted off the pallet. Further, in accordance with the present invention, the pallet itself is clamped on opposite sides thereof with a force sufficient to permit lifting and transporting of the pallet. The clamped pallet with the gripped stones thereon, and while continuing such gripping engagement of the stones, is transported to a position over a cube and lowered until the pallet is immediately above and in near contact with a previous layer on the cube (or with the cube pallet if the tier is to be disposed on the pallet). While maintaining the side gripping forces on the stones and maintaining the stone gripping subassembly against movement, the pallet is withdrawn laterally from beneath the stones to permit the same to settle into position on the cube. Thereupon, the gripping forces upon the stones are released thereby ensuring that all the stones settle onto the cube. The pallet clamping and stone gripping assemblies are raised to clear the deposited tier, and these assemblies, with the empty pallet, are returned to the pickup station where the clamping and gripping assemblies are positioned over a further new pallet having stones thereon and the empty pallet is positioned over the conveyor at a location downstream of the new pallet bearing the stones. The empty pallet is released onto the conveyor and the pallet clamping assembly is moved forward to clamp the new pallet. These procedures are repeated as many times as desired to complete the cube.

It is to be noted that the pressure exerted laterally against the sides of the tier of stones on a pallet is sufficient to urge the stones into contact one with another but is insufficient to create a self-supporting unit of the stones. In this manner, when the pallet is withdrawn from beneath the stones, there is a tendency for the stones to remain in their configuration, but after the pallet has been withdrawn a sufficient distance from underneath the tier of gripped stones, the stones begin to lose their bridging effect one with another and to slump downwardly into contact with the previous tier of stones. Notably, this slumping is of a gradual nature, with one, two or three stones beginning the slump and the slump then continuing in a wave-type motion as the pallet is withdrawn, as opposed to an abrupt dropping of a majority of the stones simultaneously onto the subtending tier. By reason of this "gradual" downward movement of the tier of gripped stones, it has been found that there occurs a minimum of breakage of a stone in the course of its movement onto the subtending tier. Further, the substantial lateral forces applied to the tier of stones retains the stones in their desired tiered configuration and permits the ready positioning of the entire tier over the subtending tier for accurate placement of the new tier on the cube.

DETAILED DESCRIPTION OF THE INVENTION

With reference to FIG. 1, there is depicted a relatively thin, e.g. ½ inch thick, flat pallet 12 having mounted on its top surface 14 a plurality of nonrectilinear stones 16, 18, 20 and 22. The stones 16 display a generally oblong geometry; the stones 18 display a generally square geometry; and, the stones 20 and 22 display generally trapezoidal geometries. In some instances, the stones are of circular geometry or even of other highly irregular geometry. Each of the stones commonly has rounded corners and/or edges. On the pallet 12 there may be provided a plurality of differently sized stones, the several stones constituting a tier of a subsequently to-be-formed cube of the stones.

Figure 3:
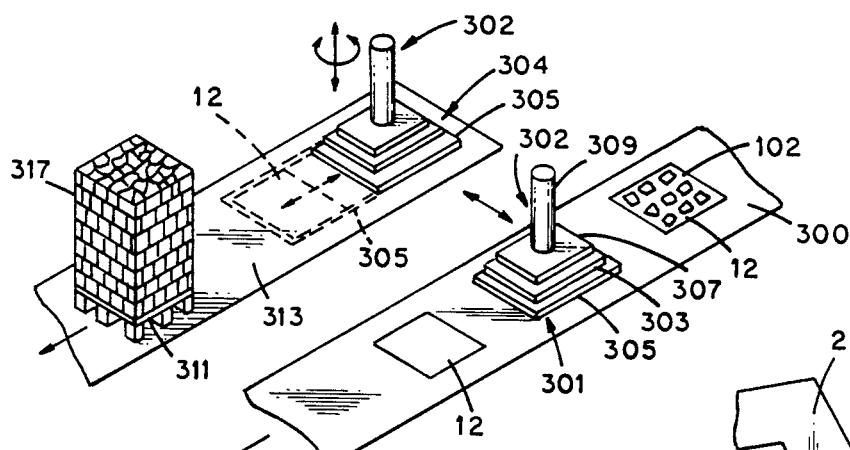
FIG. 3 is a schematic representation of certain physical movements and/or motions employed in carrying out the method of the present invention.

Certain of the general concepts of the present invention are depicted diagrammatically in FIG. 3. As shown in this figure, a pallet 12 bearing a tier of stones 102 is transported by a conveyor 300 from a kiln or from a storage site to a pick-up station 301. In this station, a transfer apparatus 302, comprising a tier gripping assembly 303, a pallet clamping assembly 305, a rotator assembly 307, and a vertical positioning assembly 309, is moved into position over the pallet 12 so that the tier holding assmebly can engage the tier of stones on the pallet, and so that the pallet clamping assembly can engage and clamp the pallet for lifting and movement of the pallet laterally to a cubing station 304. In the cubing station, the clamped pallet is lowered until it is positioned slightly, e.g. less than about ¼ inch above, a shipping pallet 311 or above a previously deposited tier of stones of a cube 317 being formed. As desired, the pallet 12 is rotated to place the stones on the pallet in the desired alignment with the stones of a previously deposited tier, as for reasons of interlocking of stones between adjacent tiers. Once the pallet 12 is in the desired position, the pallet clamping assembly 305 is moved laterally, i.e. from the cubing station 304 in the direction of the pickup station 301 in the embodiment depicted in FIG. 3, while the tier holding assembly remains in position, to withdraw the pallet 12 out of its supporting position for the stones.

Importantly, as the pallet 12 is withdrawn from beneath its supported tier of stones, the stones nearest the trailing edge of the pallet as it is withdrawn do not immediately drop onto the underlying tier of stones. But rather, the first downward movement of the stones occurs normally when the trailing edge of the pallet has moved past the abutting edges of the first and second stones (or first and second row of stones in most instances) in the tier so that the force of gravity on the stones overcomes the lateral forces exerted upon the adjacent stones by the stone gripping subassembly and which tend to hold the stones in a unit. At such times the stones "buckle" at their abutting edges. This "buckling" effect causes these abutting edges of the stones to first drop gently into contact with the subtending tier. The remainder of each stone subsequently settles relatively gently onto the subtending tier gradually and without substantial impact to thereby protect the flat stones against edge chipping and/or breaking of the body of the stone. This downward movement of each stone in the tier occurs as the pallet is withdrawn, producing a type of moving wave action of the downwardly moving stones. Once the pallet 12 is fully withdrawn from under the tier of stones, the tier gripping assembly is caused to fully release the stones so that any stone or stones which have not theretofore fully settled onto the cube, to so settle into their respective position. If desired, at this point in time, the stone gripping assembly can be lowered as needed to guide the stones as they settle onto the subtending tier. The gripping assembly and the pallet clamping assemblies thereupon are raised to clear the newly deposited stones and returned to the pickup station where the empty pallet 12 is deposited on the conveyor 300 and the transfer assembly is moved into position above a further pallet to repeat the procedure.

Referring particularly to FIGS. 4–8, the apparatus of the present invention includes a support carriage indicated generally at 19 and comprising horizontal plate support member 20 disposed horizontally between, and movably mounted between opposed elongated beams 22 and 24 of "C" cross sectional geometry. Specifically, the opposite corners 26 and 28 of the support member 20 are provided with motors 32. Each of the motors is provided with a driven shaft 34 on the outboard end of which there is mounted a wheel 36 which rides on the lower horizontal flange of the support beam 24. The other motor 32 on the opposite corner of the horizontal support member 20 is likewise provided with a driven shaft 40 whose outboard end secures a driven wheel 42 which rides on the lower horizontal flange 44 of the beam support 22. As may be seen in FIG. 7, further motors and driven wheels are provided on the other two of the four corners of the support member 20. The horizontal support member 20 is secured, as by welding, to a vertical tubular housing 46. By these means the tubular housing 46 is mounted for horizontal lateral movement along the length of the support beams 22 and 24.

Within the tubular housing 46 there is mounted a tubular shaft 50 adapted for vertical reciprocal movement within the housing 46. The alignment of the shaft 50 within the housing 46 is maintained as by a plurality of friction wheels 53 mounted in the outer walls of the housing 46. The vertical position of the shaft 50 is selectable as by means of a hydraulic piston-cylinder unit 52 including a cylinder 54 and a piston member 56. The lowermost end 58 of the cylinder 54 is hingedly attached as by a clevis 60 to the upper surface 62 of a rotator housing 64. The outboard end of the piston 56 is secured to the lowermost end 66 of the housing 46 as by means of a clevis 68. The piston-cylinder unit 52 preferably is of the double acting type and includes hydraulic lines 70 and 72 which lead to a source of hydraulic pressure as will be further described hereinafter.

The rotator housing 64 is secured to the lowermost end 74 of the shaft 50 and serves to support the several gripping and clamping devices as will be disclosed further hereinafter, both for vertical positioning of these devices as a whole and for rotational adjustment of the devices as a whole.

Figure 8:
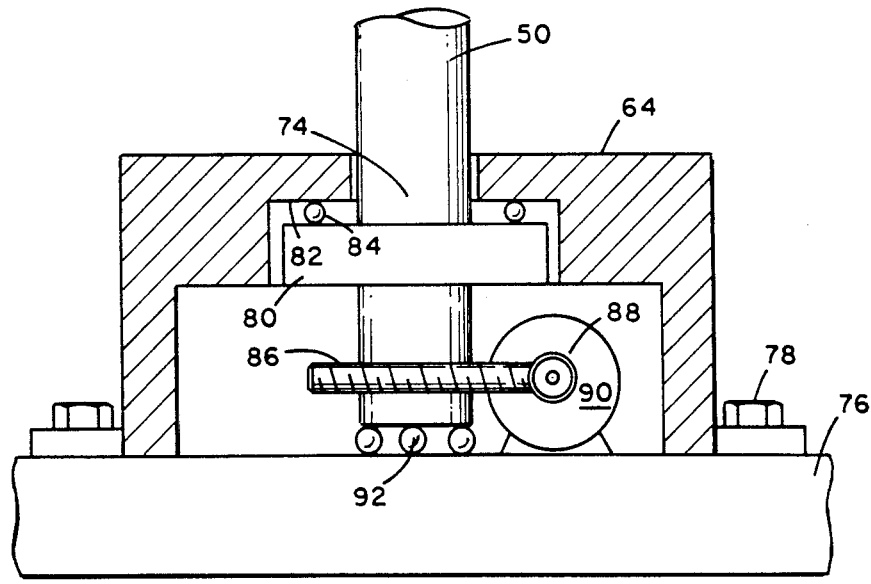
FIG. 8 is a fragmentary representation of a rotator assembly.

Specifically, as best seen in FIG. 8, in one embodiment, the rotator housing 64 encircles the lowermost end 74 of the shaft 50 and is secured to a frame member 76 as by means of bolts 78. The lowermost end 74 of the shaft 50 is provided with an annular projection 80 whose top surface is overlaid by a surface 82 of the housing 64. Bearing means 84 are disposed between the surfaces 80 and 82 to provide for rotational movement of the housing with respect to the shaft 50 which is fixed against rotation by reason of its mounting within the housing 46. The end 74 of the shaft 50 is further provided with a circumferential gear 86 that is engaged by a worm-gear 88 attached to the drive shaft of a motor 90, the motor 90 being secured to the frame member 76. Thus, it will be visualized that upon activation of the motor 90, rotation of the worm-gear 88, which meshes with the gear 86 and acts in concert therewith, causes the housing 64 to rotate about the shaft 50. This rotational movement is imparted to the beam 76 which in turn is one of the primary support members for the stone gripping and pallet clamping assemblies. Thrust bearings 92 may be provided between the end of the shaft 50 and the beam 76.

Figure 4:
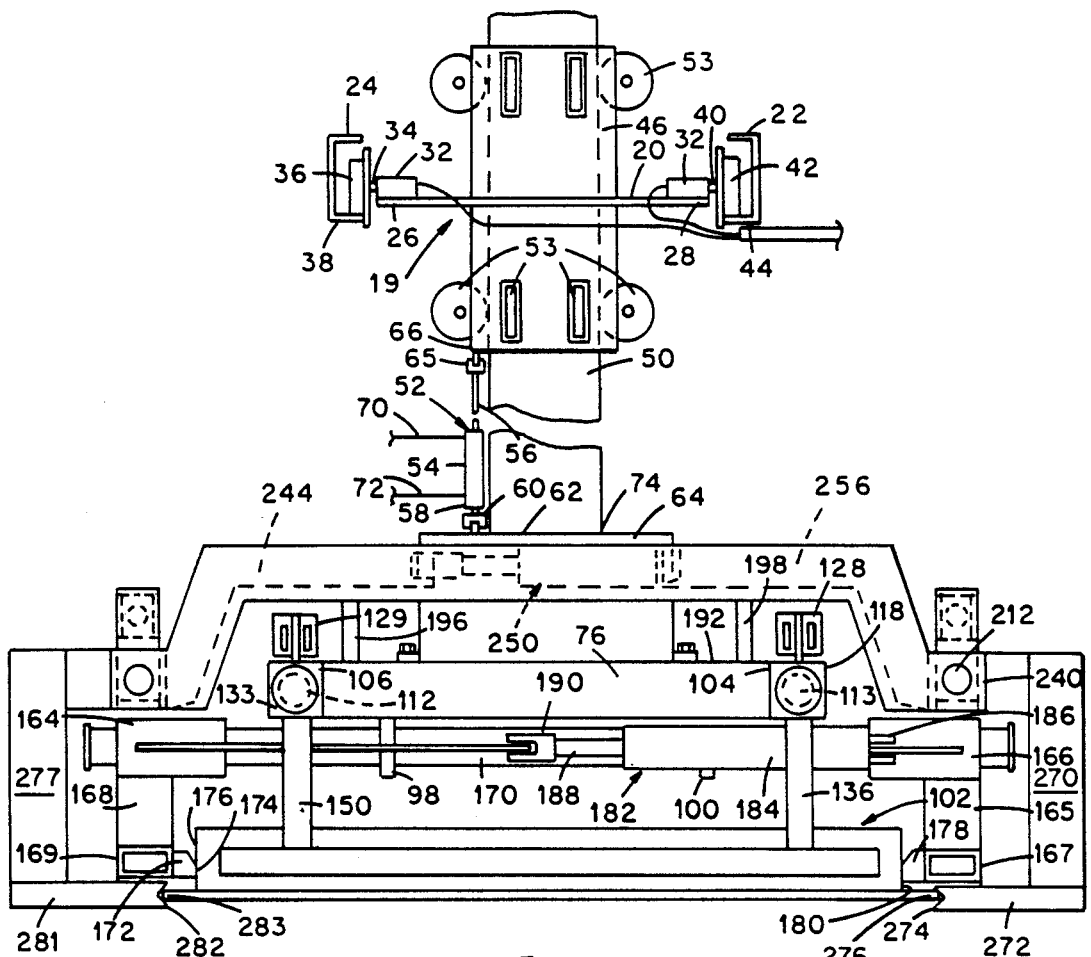
FIG. 4 is an end elevation view, partly fragmentary, of one embodiment of apparatus employed in the present invention.
Figure 5:
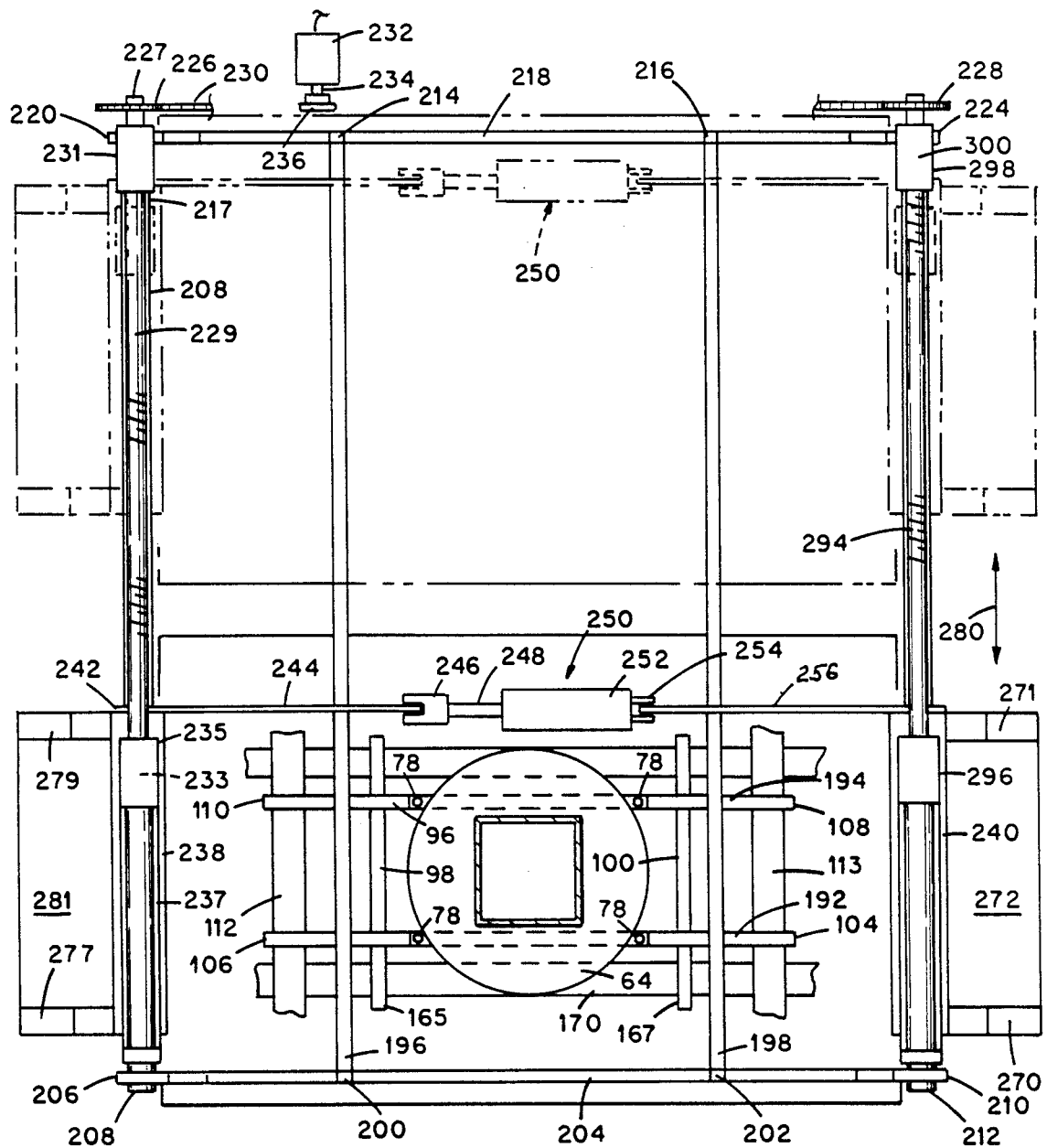
FIG. 5 is a plan view, partly fragmentary, of the apparatus shown in FIG. 4.
Figure 6:
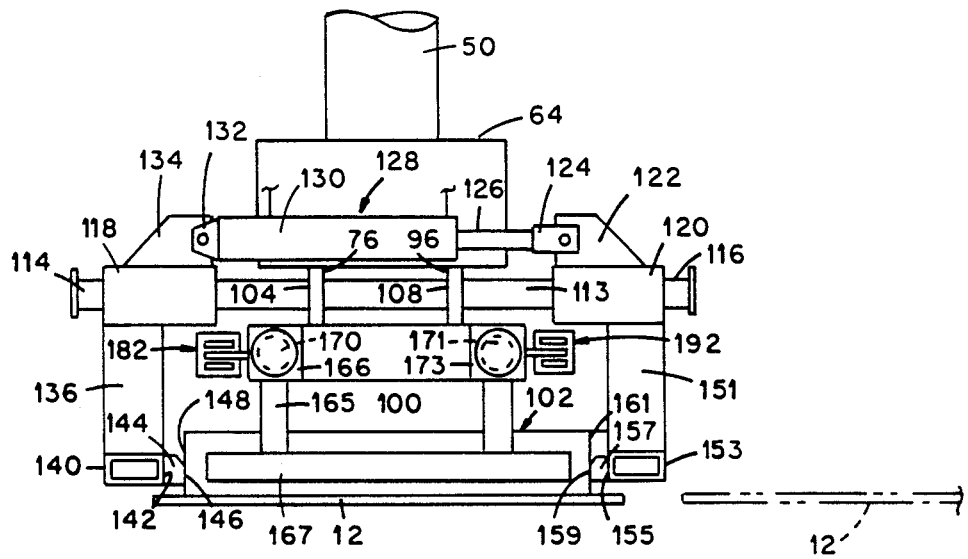
FIG. 6 is a side elevation view, partly fragmentary, of the apparatus shown in FIG. 4.

Referring now to FIGS. 4, 5 and 6 specifically, it may be further seen that the rotator housing 64 is secured to crossbeams 76 and 96 as by bolts 78. The cross members 76 and 96 provide support for further cross members 98 and 100 to provide the support framework for stone gripper subassemblies that contact the opposite sides of a tier of blocks represented generally at 102. More specifically, the outboard ends 104 and 108 of support beams 76 and 96, respectively, receive therein elongated shaft 113. In like manner, the outboard ends 106 and 110 of the support beams 76 and 96, respectively, receive therein the shaft 112. As may best be seen in FIG. 6, the opposite ends 114 and 116 of the shaft 113 have slidably mounted thereon a first slidemember 118, mounted on end 114 and a second slidemember 120, mounted on end 116. The slide member 120 is provided with an upstanding mount 122 to which there is pinned a clevis 124 mounted on the outboard end of a piston member 126 of a piston-cylinder device 128. The cylinder member 130 of the piston-cylinder device 128 is further pivotedly connected as by a clevis 132 to a mount 134 which is upstanding from the slide 118. The shaft 112 is provided with like slidemembers, only one 133 of which is shown, which are connected by a piston-cylinder device 129 in like manner as described for slide members 118 and 120. Thus it may be visualized that upon the actuation of the piston-cylinder devices 128 and 129, which act in unison, the slides 118 and 120 (and the like slides on shaft 112) may be reciprocated along the length dimension of their respective shafts 112 and 113. The slide 118 has depending therefrom a support member 136 (see FIGS. 4 and 6) to the lowermost end of which there is attached an elongated horizontal member 140. On the innermost surface 142 (see FIG. 6) of the member 140 there is provided an elongated gripper member 144 whose innermost edge 146 is designed to contact the side 148 of the tier of blocks 102. The opposite slide 133 on shaft 112 of this stone gripper subassembly is similarly provided with a depending support member 150 to the lowermost ends of which the horizontal support member 140 is also attached, thereby connecting the support members 136 and 150. The slide 120 on shaft 113 is also provided with a depending support member 151 to the lowermost end of which is attached an elongated horizontal member 153. On the innermost surface 155 of the member 153 there is provided an elongated gripper member 157 whose innermost edge 159 is designed to contact the side 161 of the tier of stones 102. Upon the actuation of the piston-cylinder devices 128 and 129, the gripper members 144 and 157 are caused to engage or disengage opposite sides 148 and 161 of the tier of blocks on the pallet 12.

The gripping of the other sides 176 and 180 of the tier 102 is accomplished by means which includes support members 98 and 100 which serve to mount shafts 170 and 171. A pair of slides 164 and 166 are reciprocably mounted upon the shaft 170 which is mounted on the outboard ends 165 and 167 of the support members 98 and 100, respectively. The slide 164 includes a depending support member 168 having a horizontal support member 169 attached to the lowermost end thereof. The support member 169 is provided with a gripper member 172 whose innermost surface 174 is adapted to engage the side 176 of the tier of blocks 102. The slide 166 is provided with a similar depending support arrangement which includes a depending support member 165, a horizontal support member 167 and a gripper member 178 adapted to engage the side 180 of the tier of blocks 102. The opposite ends of shaft 171 are also provided with slide members (only slide member 173 is shown; see FIG. 6) identical to the slide members 164 and 166 and with identical depending support members which also provide support to the gripper members 172 and 178. Certain of these elements are not depicted for purposes of clarity.

The slides 164 and 166 are connected to one another by means of a piston-cylinder device indicated generally at 182 and comprising a cylinder member 184 connected as by a clevis 186 to the slide 166. The piston member 188 of the piston-cylinder device 182 is connected as by a clevis 190 to the slide 164. A substantially identical piston-cylinder device 192 connects the slide members on the shaft 171. Thus, it may be visualized that upon actuation of the piston-cylinder devices 182 and 192, the slides 164, 166, and the slides on shaft 171 are caused to move along the length of the shafts 170 and 171 thereby moving the gripper members 172 and 178 into and out of engagement with the sides 180 and 176 of the tier of blocks 102.

Based upon the foregoing description, it will be recognized that through the controlled actuation of the several piston-cylinder devices, side pressure can be applied selectively to each of the opposite four side of a tier of stones 102 supported on a pallet 12.

Figure 7:
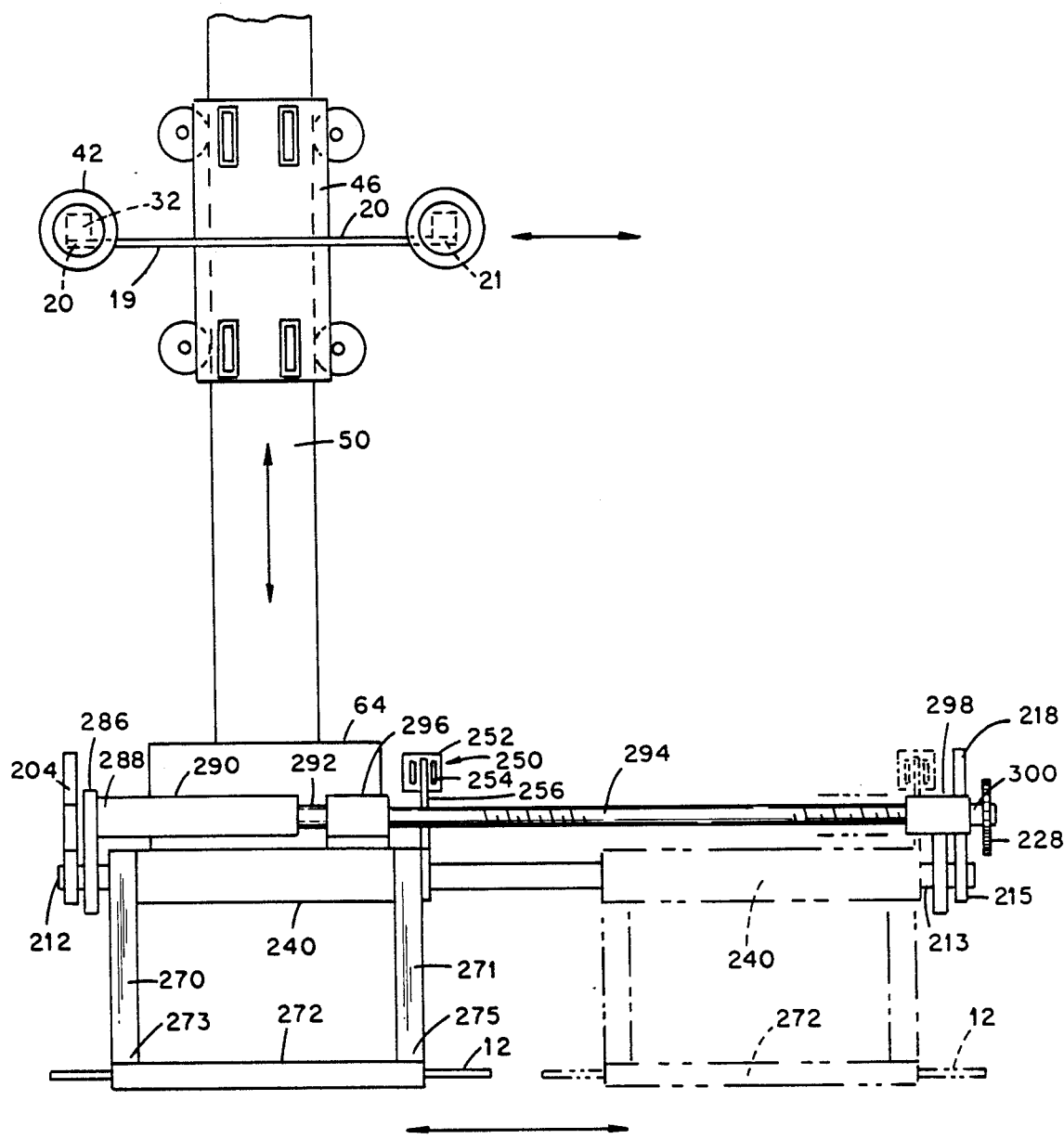
FIG. 7 is a side view, partly fragmentary, of the apparatus shown in FIG. 6.

As depicted in FIGS. 5 and 7, the outboard end 210 of the U-shaped cross member 204 serves to mount therein one end of a shaft 212. This shaft is oriented parallel to the elongated support member 198. Its opposite end 213 is mounted in the outboard end 215 of a further U-shaped support member 218. As best seen in FIG. 5, this U-shaped member 218 is itself supported on the outboard ends 214 and 216 of the elongated support members 196 and 198. The opposite outboard end 220 of the U-shaped support member 218 provides support for the end 217 of the shaft 208. By reason of these U-shaped support members 204 and 218, the shafts 208 and 212 are rigidly supported on opposite sides of and parallel to the elongated support members 196 and 198. The shaft 212 further provides support for a tubular housing member 240 that is both rotatable about the circumference of the shaft 212 and which is also slidable in the direction of the longitudinal dimension of the shaft 212. This tubular member 240 has secured to one end thereof a generally U-shaped connector 256 which is connected as by a clevis 254 to a cylinder member 252 of a piston-cylinder device 250. The piston member 248 of the piston-cylinder device 250 is connceted as by a clevis 246 to a further L-shaped connector 244 whose opposite end 242 is rigidly secured to a further tubular housing member 238 which is rotatably and slidably received on the shaft 208. The tubular housing 240 has secured to its opposite ends first and second frame members 270 and 271 the lowermost ends 273 and 275, respectively, of which are interconnected as by a horizontal support member 272. The outboard edge of member 272 is provided with a V-groove 274 along the innermost edge thereof which is adapted to receive therein a side edge of the pallet 12. The tubular housing 238 is likewise provided with support members 277 and 279 whose lower ends are connected to a pallet clamp member 281 whose outboard edge 282 is provided with a V-groove along such edge adapted to engage the side edge 283 of the pallet 12. Thus it may be visualized that upon actuation of the piston-cylinder device 250, the L-shaped arms 244 and 256 cause the housings 238 and 240 connected thereto to rotate about their respective shafts 208 and 212 to move the pallet clamps 272 and 281 into and out of engagement with the side edges 276 and 283 of the pallet 12.

Figure 3A:
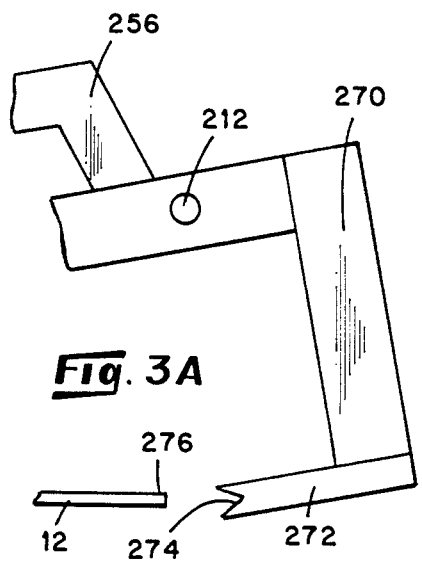
FIG. 3A is a fragmentary representation of a clamping member for a pallet.

In FIG. 3A there is depicted a fragmentary view of the pallet side edge clamping member to illustrate the action of the clamping member upon actuation of the piston-cylinder device 250. Specifically, upon withdrawal of the piston member 248 within the cylinder 252, the connector members 242 and 256 are pulled toward one another thereby resulting in pivotal movement of the support members 270 and the clamping members 272 and 264 about the axis of the shaft 212 to release the clamping member from engagement with the edges of the pallet 12, In like manner, activation of the piston-cylinder unit 250 to extend the piston member 248 out of the cylinder 252 causes the clamping members 264 and 272 to engage the side edges of the pallet 12.

With particular reference to FIG. 7, the shaft 212 further provides support for a rigid mount 286 that upstands from the shfat 212 to receive one end 288 of a hollow tubular housing 290 that extends from the mount 286 in cantilevered fashion to receive therein one end 292 of a ball-screw 294. A ball nut 296 encircles the end 292 of the ball-screw 294 and is anchored to the housing 240. The opposite end of the ball-screw 294 is received in a bearing 298 with the end 300 of the ball-screw projecting through the bearing to receive thereon a sprocket 228 (see also FIG. 5). A chain 230 is entrained about the sprocket 228 and further entrained about a further sprocket 226 that is mounted on the end 227 of a further ball-screw 229 which has its end 227 received in a bearing 231 and its opposite end 233 passing through a ball nut 235 supported in the outboard end of a tubular housing 237 mounted on the shaft 208.

The chain 230 is further entrained about a driven sprocket 236 mounted on a shaft 234 of a reversible motor 232 to provide a driving force to the chain 230, hence imparting rotational movement to the shafts 208 and 212 through the sprockets 227 and 228. Such rotational movement of the shafts 208 and 212 acting through their fixedly mounted ball nuts 298 and 235 cause the tubular housings 238 and 240 to slide along the length of the shafts 208 and 212 to thereby move the pallet clamping subassembly along the length of the shafts 208 and 212 away from the tier gripping subassemblies. When the pallet 12 is clamped between the pallet clamps 272 and 281 and the ball-screws are activated as noted above, the pallet 12 is caused to move out from under a tier of blocks 102 held on the pallet and be moved to a location separated from the tier 102, such movement being generally indicated by the arrow 280 in FIG. 5 and FIG. 7.

As this clamping assembly is moved the stone gripping assemblies remain stationary. In this manner, while the tier of stones 102 is gripped as by the pressure members 172, 178, 158 and 144, the pallet 12, while clamped by the clamps 264 and 272 is caused to slide from under the tier of stones 102 to a location spaced apart from the cube being formed. As the pallet is gradually moved from under the tier of stones 102, the individual stones move downwardly by a distance equal to the approximate thickness of the pallet 12 to rest upon the previously deposited tier of stones. It is important to note that these stones do not move down abruptly, but one edge of each stone drops first followed by the opposite edge of the stone as the pallet is moved progressively from underneath each stone. This results in a type of "wave" movement of the stones downwardly into contact with the previously deposited tier of stones.

Figure 9:
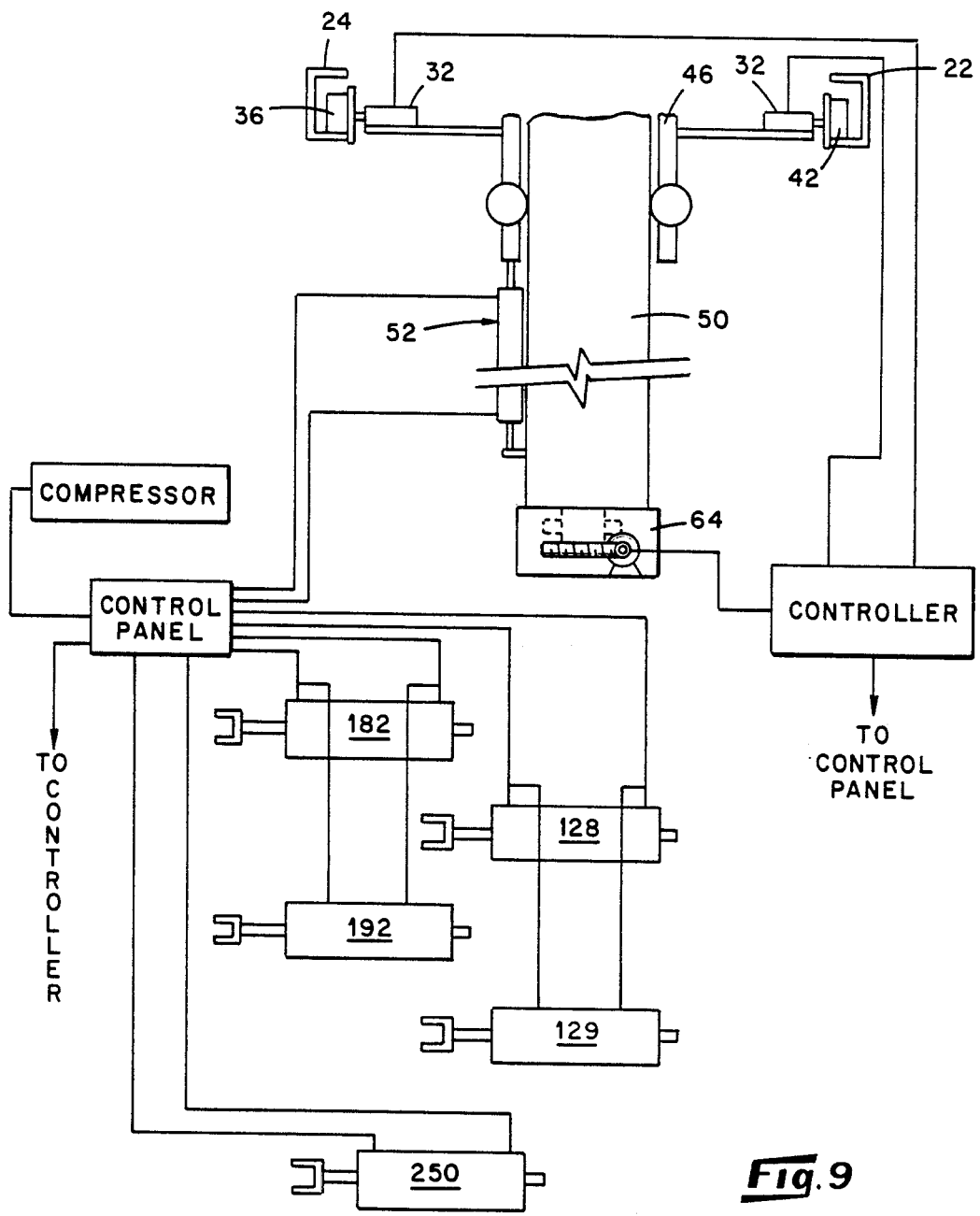
FIG. 9 is a schematic representation of a control system for the apparatus shown in FIG. 4.

With specifc reference to FIG. 7 and 9, the general operation of the present invention may be visualized. Specifically, a pallet 12 containing a tier of blocks 102 is received from a kiln or similar location by means of a conveyor 300. The cubing apparatus indicated generally at 302, of the present invention, is caused to move to its position over a pallet containing a tier of stones. Thereupon the piston-cylinders 182, 192, 128 and 129 are activated to cause the pressure members 172, 178, 158 and 144 to engage their respective sides of the tier of stones 102 on the pallet 12. The piston-cylinder member 250 is activated to cause the clamps 264 and 272 to engage the side edges of the pallet 12. Thereupon the piston-cylinder unit 52 is activated to raise the gripping and clamping assemblies, thereby raising the pallet with the stones thereon off the conveyor 300 to a height greater than the height of the highest tier in the cube being formed in the cubing station. Thereupon, the motors 32 are activated to move the pallet and stones laterally to the cubing station indicated generally at 304. At the cubing station, as necessary, the motor 90 is activated to rotate the pallet to orient the tier of stones as may be desired with respect to the previously deposited tier, if any, in the cubing station. The pallet with the tier of stones thereon is lowered to a position just immediately above the preceding tier of stones whereupon the motor 232 is activated to rotate the ball shafts 208 and 212 to move the pallet clamping assembly laterally, thereby withdrawing the pallet 12 from beneath the tier of stones. In the preferred embodiment, the lateral movement of the pallet 12 is over a distance that is at least equal to but not substantially greater than about twice the width dimension of the pallet as measured in a direction normal to the direction of the clamping forces applied to the pallet. The rate of movement of the withdrawing pallet is established and maintained at a linear speed of the pallet of less than about 120 inches per minute, thereby ensuring that the stones do not drop precipitously onto the stones of a subtending layer, but rather the gentle gradual downward movement of the stones occurs as described hereinbefore. Following full withdrawal of the pallet from beneath the tier of stones, the piston-cylinder 52 is activated to raise the gripping and clamping assemblies to a height sufficient to clear the newly deposited tier. Thereupon the motors 32 are activated to drive the gripping and clamping assemblies along the length of the beams 22 and 24 to the pickup station whereupon piston-cylinder device 52 is activated to lower the stone gripping assembly over a new pallet loaded with stones and simultaneously to lower the empty pallet over the conveyor 300. The piston-cylinder device 250 is then activated to release the pallet for deposit on the conveyor 300. Thereupon, the motor 232 is activated in reverse to rotate the ball shafts 208 and 212 to move the pallet clamping assembly laterally and back in to register with the stone gripping assembly disposed above the new pallet loaded with stones. The procedures are repeated until the desired number of tiers of stones are deposited in the cubing station 304.

As depicted in FIG. 9, each of the piston-cylinder devices 52, 128, 129, 182, 192 and 250 preferably is of the double-acting type thereby providing positive control over their operation. Help pressured hydraulic fluid for. powering each device is supplied by a compressor. Each motor preferably is electrically powered. Sequencing of the various operations is by means of any suitable controller, all of which is well within the skill of the art.

Whereas specific embodiments of the apparatus are shown and described, it is intended that the invention include all embodiments coming within the scope of the claims appended hereto.

What is claimed is:

1. A method for cubing a plurality of tiers of stones comprising the steps of:
   disposing a tier of said stones on a flat planar pallet,
   introducing said pallet bearing said tier of stones thereon to a pick-up station,
   at said pick-up station, applying a clamping force to opposite sides of said pallet, said clamping force being adequate to permit movement of said clamped pallet without inadvertent release of the same, and while maintaining said clamping force on said pallet, applying a side gripping force to opposite sides of said tier, such force being less than adequate to maintain said stones of said tier in self-supporting frictional engagement one with another, conveying said clamped pallet to a cubing station in a position above the desired location for deposit of said tier, while maintaining said gripping force against said tier, withdrawing said pallet substantially horizontally out of supporting relationship to said tier and releasing said gripping force against said tier.

2. The method of claim 1 and including the step of depositing said empty pallet on a take-off conveyor located remote from said cubing station.

3. The method of claim 2 and including the step of returning to said pick-up station and thereafter repeating said steps.

4. The method of claim 1 wherein the side gripping force applied to said tier is less than about 40 pounds per square inch.

5. The method of claim 1 wherein said side gripping force is automatically relieved to a value less than that value required to maintain said stones of said tier in self-supporting frictional engagement one with another.

6. The method of claim 1 wherein said pallet is withdrawn at a lineal speed of less than about 120 feet per minute, whereby said stones are permitted to buckle at their abutting edges as said pallet is withdrawn and thereby to settle relatively gently onto a subtending surface of stones or other supporting surface.

7. The method of claim 6 wherein said stones buckle progressively as the trailing edge of said pallet is withdrawn from beneath said stones.

8. Apparatus for cubing a multiplicity of tiers of stones, each such tier comprising a plurality of stones of nonrectilinear geometries and being introduced to said apparatus while supported on a flat pallet, comprising:

a gripping assembly adapted to engage opposite sides of said tier of stones on said pallet and apply a gripping force thereto that is less than that force sufficient to frictional bind said stones in said tier into a unitary unit capable of self-support within said gripping assembly, a clamping assembly adapted to engage opposite sides of said pallet for supporting the same for lifting and positioning thereof, drive means associated with said gripping and clamping assemblies and operative to move said gripping assembly between positions of engagement and disengagement with said tier of stones, to move said clamping assembly between positions of engagement and disengagement with said pallet, and when said gripping assembly is in engagement with said tier, to move said pallet horizontally away from its supporting position for said tier.

9. Apparatus for forming a cube comprising a multiplicity of tiers of individual stones that are unsuitable for clamping into a self-supporting unit by means of side pressure applied thereto comprising:

a pallet defining a surface for receiving a plurality of said stones, first and second side gripper means, means mounting said first side gripper means for lateral movement into and out of frictional engagement with at least one first side of a tier of stones on said pallet, means mounting said second side gripper means for lateral movement into and out of frictional engagement with at least one other side of said tier of stones on said pallet, said other side being located substantially diametrically across said tier from said first side, means adapted to urge said first and second side gripper means selectively toward and away from engagement with said sides of said tier, third and fourth side gripper means, means mounting said third gripper means for lateral movement into and out of frictional engagement with at least one further side of said tier of stones on said pallet, means mounting said fourth side gripper means for lateral movement into and out of frictional engagement with at least one still further side of said tier of stones on said pallet, said still further side being located substantially diametrically across said tier from said further side, means adapted to urge said third and fourth side gripper means selectively toward and away from engagement with said side of said tier, whereby when said first, second, third and fourth side gripper means are urged against said sides of said tier, adjacent ones of stones within said tier are urged into abutting engagement one with another with a force that is less than that force which is sufficient to frictionally bind said stones in said tier into a unit that would permit said tier to be lifted from said pallet as a unit and moved without additional support other than the pressure exerted thereagainst by said plurality of side gripper means, first and second pallet clamping means, means mounting said first and second pallet clamping means for reciprocatory movement between positions of engagement and disengagement with opposite sides of said pallet disposed therebetween whereby said pallet is supported between said first and second pallet clamping means when said pallet clamping means is moved into its position of engagement with opposite side of said pallet, and, means mounting said first and second pallet clamping means for reciprocatory horizontal movement over a distance at least twice the width dimension of said pallet clamped therebetween as measured normal to the direction of the clamping force applied to said pallet.

* * * * *